(12) United States Patent
Lyons et al.

(10) Patent No.: US 9,868,841 B2
(45) Date of Patent: Jan. 16, 2018

(54) METHOD TO REPROCESS CROSS-LINKED FOAM AND PRODUCTS PRODUCED THEREFROM

(71) Applicant: INTEVA PRODUCTS, LLC, Troy, MI (US)

(72) Inventors: Kevin Mark Lyons, Clawson, MI (US); Kenneth Alan Gassman, Lake Orion, MI (US); Xinhua He, Bloomfield Hills, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 15/099,863

(22) Filed: Apr. 15, 2016

(65) Prior Publication Data
US 2016/0304695 A1    Oct. 20, 2016

Related U.S. Application Data

(60) Provisional application No. 62/148,321, filed on Apr. 16, 2015.

(51) Int. Cl.
| | |
|---|---|
| C08J 11/06 | (2006.01) |
| B29B 17/00 | (2006.01) |
| B29K 21/00 | (2006.01) |
| B29K 23/00 | (2006.01) |
| B29K 105/04 | (2006.01) |
| B29K 105/26 | (2006.01) |
| B29L 9/00 | (2006.01) |
| B29K 105/24 | (2006.01) |

(52) U.S. Cl.
CPC ........... *C08J 11/06* (2013.01); *B29B 17/0026* (2013.01); *B29B 17/0036* (2013.01); *B29K 2021/006* (2013.01); *B29K 2023/0691* (2013.01); *B29K 2023/12* (2013.01); *B29K 2105/04* (2013.01); *B29K 2105/24* (2013.01); *B29K 2105/26* (2013.01); *B29L 2009/00* (2013.01); *C08J 2323/02* (2013.01); *C08J 2423/06* (2013.01); *C08J 2423/12* (2013.01); *Y02W 30/62* (2015.05)

(58) Field of Classification Search
CPC ........................................................ C08J 11/06
USPC ............................................................ 521/47
See application file for complete search history.

(56) References Cited

U.S. PATENT DOCUMENTS

| | | | |
|---|---|---|---|
| 5,977,294 A | 11/1999 | Hoehn | |
| 6,090,862 A | 7/2000 | Tatsuda et al. | |
| 6,384,093 B1 * | 5/2002 | Bourland | ................. C08J 11/06 521/40.5 |
| 6,797,216 B2 | 9/2004 | Furgiuele et al. | |
| 8,262,959 B2 | 9/2012 | Katz | |

FOREIGN PATENT DOCUMENTS

| | | |
|---|---|---|
| EP | 0749818 A2 | 12/1996 |
| EP | 2138292 A1 | 12/2009 |
| JP | 2000140794 A | 5/2000 |
| WO | 9213696 A1 | 8/1992 |

OTHER PUBLICATIONS

European Search Report for European Application No. 16165232, dated Aug. 1, 2016, 3 pages.
European Written Opinion for European Application No. 16165232, dated Aug. 1, 2016, 3 pages.

* cited by examiner

*Primary Examiner* — Terressa Boykin
(74) *Attorney, Agent, or Firm* — Cantor Colburn LLP

(57) ABSTRACT

Disclosed herein is a method of making a melt-processable material comprises: processing a cross-linked polymeric foam to form a processed cross-linked polymeric foam material wherein the processed cross-linked polymeric foam material has an average particle size suitable for feeding to a melt processor, feeding the processed cross-linked polymeric foam material to the melt processor, and melt mixing a composition comprising the processed cross-linked polymeric foam material and a thermoplastic material wherein the processed cross-linked foam material has a domain size, under melt mixing conditions, less than or equal to the processing spaces of the melt processor.

15 Claims, No Drawings

METHOD TO REPROCESS CROSS-LINKED FOAM AND PRODUCTS PRODUCED THEREFROM

BACKGROUND

Recycling polymeric materials is becoming increasingly important and economically valuable. There has been considerable progress in recycling thermoplastic polymeric materials but recycling cross-linked (also known as thermoset) materials still poses significant challenges. Once a polymer is cross-linked it will not melt again and this feature has been a key obstacle to recycling cross-linked materials. Additionally, cross-linked materials, particularly cross-linked foamed materials, are frequently bonded to thermoplastics. Attempts to reuse these materials have typically involved separating the thermoplastic from the cross-linked foam—a time consuming and labor intensive process. Recycling a cross-linked material has involved various chemical methods of reducing the number of cross links. These methods are generally expensive and can negatively impact the environment. When these methods are applied to cross-linked foam there is the additional issue of gas release from the foam cells which can negatively impact the final product. Even when the cross-linked material is processed sufficiently for reuse, residual cross linking agents can also affect the final product negatively.

There remains a need in the art for a method of reprocessing cross-linked materials, especially foamed cross-linked material.

BRIEF DESCRIPTION

Described herein is a method of making a melt-processable material comprising: processing a polymeric material comprising a thermoplastic material and a cross-linked polymeric foam to form a processed polymeric material comprising a processed thermoplastic material and a processed cross-linked polymeric foam wherein the processed polymeric material has an average particle size suitable for feeding to a melt processor, feeding the processed polymeric material to the melt processor and melt mixing a composition comprising the processed polymeric material at a temperature sufficient to melt the processed thermoplastic material wherein the processed cross-linked foam has a domain size, under melt mixing conditions, less than or equal to the processing spaces of the melt processor.

In another embodiment, a method of making a melt-processable material comprises: processing a cross-linked polymeric foam to form a processed cross-linked polymeric foam material wherein the processed cross-linked polymeric foam material has an average particle size suitable for feeding to a melt processor, feeding the processed cross-linked polymeric foam material to the melt processor and; melt mixing a composition comprising the processed cross-linked polymeric foam material and a thermoplastic material wherein the processed cross-linked foam material has a domain size, under melt mixing conditions, less than or equal to the processing spaces of the melt processor.

Also described herein is a melt-processable polymeric material comprising a thermoplastic matrix and dispersed cross-linked domains wherein the cross-linked domains are compressible.

The above described and other features are exemplified by the following detailed description.

DETAILED DESCRIPTION

Disclosed herein is a method of reprocessing a cross-linked foam. A cross-linked foam is defined herein as a foamed material which has at least 10% cross-linking level. Materials having a cross linking level less than 10% typically melt and would not be appropriate for use in the method and materials described herein. Cross-linked foams can be reprocessed individually or when bonded to a thermoplastic. Exemplary cross-linked foams include cross-linked vinyl polymers such as polyethylene, polypropylene, and polystyrene as well as cross-linked polyurethane and cross-linked synthetic elastomers. The cross-linked foams can comprise residual blowing agent, residual cross linking agent, or both. The cross-linked foam may be an open cell foam or a closed cell foam. The cross-linked foam can be industrial waste (also known as scrap or offal), post-consumer waste, or a combination thereof.

In some embodiments the cross-linked foam is bonded to one or more thermoplastic materials. Exemplary thermoplastic materials include non-cross-linked vinyl polymers such as polyethylene, polypropylene, polyvinyl chloride, polyester, non-vulcanized rubber, and synthetic elastomer. The bonded material can be in any form such as a single layer or multi-layer sheet, the foam surrounded by thermoplastic in a design required shape, foam adhered to thermoplastic in a design required shape, or a combination thereof. The weight ratio of cross-linked foam to thermoplastic in the bonded material to be reprocessed varies from 1 to 99 to 99:1. Within this range the ratio can be 10 to 90 to 90 to 10. Additionally the bonded material to be reprocessed can be industrial scrap, post-consumer waste, or a combination thereof.

Prior to melt mixing, the cross-linked polymeric foam (alone or bonded to a thermoplastic material) is processed into a form that is suitable for feeding to a melt processor. Suitable melt processors include extruders, both single screw extruders and multiple screw extruders. In addition to this requirement, and dependent on the target application of the melt-processable material, the cross-linked foam material may require more stringent processing to achieve the desired level of trapped gas in the melt-processable material. For example, a sheet application may require the processed cross-linked foam to have an average particle size that is less than or equal to the average cell size of the cross-linked polymeric foam. Tailored properties (e.g., hardness) are possible based on the average particle size of the processed cross-linked foam material. A processed cross-linked foam having a larger average particle size may result in a softer feel or unique haptics/appearance due to the higher level of trapped gases remaining in the melt during processing. Conversely, an extremely demanding application may require the processed cross-linked foam material to have a very small average particle size to ensure negligible levels of trapped gases are present during thermal processing. Processing includes any process that can attain the appropriate particle size such as shredding, grinding, cryo-grinding or a combination thereof. In addition to these exemplary processes, separation, consolidation (i.e., densification), or mixing (e.g., with an abrasive particle to aid in the size reduction) may also be used.

The processed cross-linked foam has domain size, under melt mixing conditions, less than or equal to the processing spaces of the melt processor. Domain size is defined as the volume occupied by a discrete portion of the processed cross-linked foam material. This domain may or may not comprise a trapped gas. The domain may or may not have a regular shape under melt mixing conditions. Additionally the domain may deform under melt mixing conditions to allow passage through the processing spaces. Processing spaces are defined as those spaces in which the melt mixed material moves through. For example, in an extruder the processing spaces would include the barrel (particularly the spaces between the screw(s) and the barrel), a melt filter (if used) and holes in the die (if used). The domain size under melt mixing conditions is less than or equal to the smallest processing spaces of the melt processor in order to prevent clogging and blockages.

When the processed material is a processed cross-linked polymeric foam material, thermoplastic materials and optional compatibilizer(s) are combined with the processed cross-linked polymeric foam material in the melt processor. The desired characteristics of the melt-processable materials will ultimately depend on the specific material system. The additional materials should be readily melt-processable and, ideally, fully compatible with all present materials. For example, a propylene-ethylene copolymer would be a suitable thermoplastic polymer to be added to a system containing cross-linked polypropylene foam or a cross-linked polypropylene foam bonded to a polyethylene skin. A compatibilizer is defined herein as an additive which facilitates the distribution of the processed cross-linked polymeric foam throughout the matrix of the melt-processable polymeric material and stabilizes the morphology of the final product. The choice of a compatibilizer is dependent upon the composition of the processed polymeric foam and the composition of the matrix of the final product. Such a choice is within the abilities of a man of ordinary skill in the art. Polymeric compatibilizers include block/graft copolymers, polymers with polar side groups, and reactive functional polymers. Also contemplated are reactive compounds which aid in the in-situ formation of copolymers. Examples include dicarboxylic acids, dianhydrides, diamines and the like.

The processed cross-linked polymeric foam may be included in the melt mixing composition in an amount of 1 to 99 weight percent, based on the total weight of the melt mixing composition. Within this range the processed cross-linked polymeric foam may be present in an amount of 5 to 95 weight percent. Similarly, the processed cross-linked polymeric foam may be present in the melt processable material in an amount of 1 to 99 weight percent, based on the total weight of the melt processable material. Within this range the processed cross-linked polymeric foam may be present in an amount of 5 to 95 weight percent.

When the processed material comprises a processed thermoplastic material no additional material may be required although additional thermoplastic may be added. If additional thermoplastic is included in the composition it may be the same as or different from the processed thermoplastic material. For example, if the processed thermoplastic material is a polyethylene the additional thermoplastic material may be polyethylene, polypropylene, or a polyolefin copolymer. A compatibilizer, as described above, may also be included in the melt mixing composition.

During melt mixing, the melt processor design and/or conditions are chosen to minimize or eliminate the effects of any residual blowing agents, cross linking agents, or a combination thereof. The melt mixing composition may also include rheology modifiers to assist with extraction of volatiles during the melt mixing process. Modifying the rheology of the melt mixing composition can facilitate removal of volatiles through the use of vacuum. Rheology modifiers may also increase the viscosity and/or melt strength of the composition after the removal of the volatiles. Common rheology modifiers include commercially available plasticizers that enhance the fluidity of a material. Certain classes of plasticizers include linear or branched phthalates, trimellitates, adipates, polymerics, and terephthalates. Processing conditions that will have an effect on the quality of the final material include, but are not limited to: screw design, screw speed, barrel temperature profile, die design, pellet size, use of an underwater pelletizer, cutter design and cutting speed, etc.

It is also contemplated that the processed polymeric material may be melt mixed to form a pelletized processed polymeric material and the pelletized processed polymeric material may be melt mixed with an additional thermoplastic material. Similarly a processed cross-linked polymeric foam may be melt mixed with a first thermoplastic to form a pelletized material which is then melt mixed with a second thermoplastic to form the melt-processable material. Rheology modifiers and compatibilizers can be added during any melt mixing step.

The invention is further illustrated by the following non-limiting examples.

EXAMPLES

Example 1

In this example a bilaminate comprising 20 weight percent cross-linked polypropylene/polyethylene foam, based on the weight of the bilaminate, bonded to thermoplastic polyolefin sheets, 80 weight percent based on the weight of the bilaminate, was used. The material was trimmings from a thermoforming process. The foam was 2.5 millimeters (mm) in thickness and had a density of 4.2 pounds per cubic foot (67.3 kilograms per cubic meter ($kg/m^3$)) The material was shredded to a size less than or equal to 0.25 inches (6.35 millimeters (mm)). The polypropylene/polyethylene foam was approximately 40% cross-linked.

The shredded feedstock was fed directly into a twin screw extruder (TSE) equipped with an under-water pelletizer. The screw speed and temperature of the TSE were held constant at 300 rotations per minute (RPM) and 200° C., respectively. This first pass through the TSE was to simply convert the shredded feedstock into pellet form (for ease of handling).

The pelletized material was melt mixed with an ethylene/propylene copolymer. The ethylene/propylene copolymer was present in an amount of 25 parts per hundred parts by weight of the pelletized material. The extruder employed vacuum assisted venting (vacuum pressure=50 to 60 millibar). The size of the pellets was adjusted via the cutter speed setting. Small pellets (approximately 6.0 mm) were chosen to reduce the diffusion length of gases at the center of the pellet (i.e., facilitating release of gas). The screw speed and temperature during the second melt mixing were held constant at 150 rotations per minute (RPM) and 200° C., respectively. The specific gravity of the pellets obtained from the second melt mixing was measured to be 0.91 grams per cubic centimeter (g/cc) (a 65% increase compared to the pellets obtained from the first melt mixing).

Example 2

The same bilaminate used in Example 1 was shredded to a size less than or equal to 0.4375 inch (11.11 mm) and fed into a chamber capable of further reducing the feedstock size and densifying the material. The chamber was heated and equipped with a rotating blade at the bottom for size reduction purposes. This chamber was held at 250 to 260° F. (121 to 127° C.) and the blade was held at a speed of 800 to 900 RPM. The chamber was connected to a single screw extruder (SSE) and continuously fed the SSE with predensified material. The temperature of the intake zone of the SSE ranged from 260 to 280° F. (127 to 138° C.).

During the SSE processing, the screw speed was held constant at 150 RPM and the temperatures ranged from 390 to 425° F. (199 to 218° C.) across the length of the barrel. Vacuum assisted venting was also used to effectively extract all volatiles from the polymer melt. No compatibilizer or other additives were used during this trial. The final specific gravity of the pellets was measured to be 0.92 to 0.93 g/cc.

Embodiment 1: A method of making a melt-processable material comprising: processing a polymeric material comprising a thermoplastic material and a cross-linked polymeric foam to form a processed polymeric material comprising a processed thermoplastic material and a processed cross-linked polymeric foam wherein the processed polymeric material has an average particle size suitable for feeding to a melt processor; feeding the processed polymeric material to the melt processor; and melt mixing a composition comprising the processed polymeric material in the melt processor at a temperature sufficient to melt the processed thermoplastic material wherein the processed cross-linked foam has a domain size, under melt mixing conditions, less than or equal to the processing spaces of the melt processor.

Embodiment 2: The method of embodiment 1, wherein the polymeric material comprises the thermoplastic material bonded to the cross-linked polymeric foam.

Embodiment 3: The method of embodiment 1 or 2 wherein the polymeric material is industrial waste, post-consumer waste, or a combination thereof.

Embodiment 4: The method of any of the preceding embodiments, wherein the processed cross-linked polymeric foam has an average particle size less than or equal to the average cell size of the cross-linked polymeric foam.

Embodiment 5: The method of any of the preceding embodiments, wherein the melt mixing composition further comprises an additional thermoplastic, a compatibilizer or a combination thereof.

Embodiment 6: A method of making a melt-processable material comprising: processing a cross-linked polymeric foam to form a processed cross-linked polymeric foam material wherein the processed cross-linked polymeric foam material has an average particle size suitable for feeding to a melt processor; feeding the processed cross-linked polymeric foam to the melt processor; and melt mixing a composition comprising a thermoplastic material and the processed cross-linked polymeric foam material in the melt processor wherein the processed cross-linked foam material has a domain size, under melt mixing conditions, less than or equal to the processing spaces of the melt processor.

Embodiment 7: The method of embodiment 6, wherein the polymeric material is industrial waste, post-consumer waste, or a combination thereof.

Embodiment 8: The method of embodiment 6 or 7, wherein the processed cross-linked polymeric foam has an average particle size less than or equal to the average cell size of the cross-linked polymeric foam.

Embodiment 9: The method of embodiment 6, 7 or 8, wherein the melt mixing composition further comprises an additional thermoplastic, a compatibilizer or a combination thereof.

Embodiment 10: The method of any of the preceding embodiments, wherein the cross-linked polymeric foam is an open cell foam.

Embodiment 11: The method of any of embodiments 1 to 9, wherein the cross-linked polymeric foam is a closed cell foam.

Embodiment 12: The method of any of the preceding claims wherein the melt processor comprises an extruder.

Embodiment 13: A melt-processable polymeric material comprising a thermoplastic matrix and dispersed cross-linked particles wherein the cross-linked particles are compressible.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt .%", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A method of making a melt-processable material comprising:
    processing a polymeric material comprising a thermoplastic material and a cross-linked polymeric foam to form a processed polymeric material comprising a processed thermoplastic material and a processed cross-linked polymeric foam wherein the processed polymeric material has an average particle size suitable for feeding to a melt processor and the processed cross-linked polymeric foam has an average particle size less than or equal to the average cell size of the cross-linked polymeric foam;
    feeding the processed polymeric material to the melt processor; and
    melt mixing a composition comprising the processed polymeric material in the melt processor at a temperature sufficient to melt the processed thermoplastic material wherein the processed cross-linked foam has a domain size, under melt mixing conditions, less than or equal to the processing spaces of the melt processor.

2. The method of claim 1, wherein the polymeric material comprises the thermoplastic material bonded to the cross-linked polymeric foam.

3. The method of claim 1, wherein the polymeric material is industrial waste, post-consumer waste, or a combination thereof.

4. The method of claim 1, wherein the melt mixing composition further comprises an additional thermoplastic, a compatibilizer or a combination thereof.

5. The method of claim 1, wherein the melt mixing composition further comprises a rheology modifier.

6. The method of claim 1, wherein processed cross-linked polymeric foam is present in an amount of 1 to 99 weight percent, based on the total weight of the melt mixing composition.

7. A method of making a melt-procesable material comprising:
processing a cross-linked polymeric foam to form a processed cross-linked polymeric foam material wherein the processed cross-linked polymeric foam material has an average particle size suitable for feeding to a melt processor and an average particle size less than or equal to the average cell size of the cross-linked polymeric foam;
feeding the processed cross-linked polymeric foam to the melt processor; and
melt mixing a composition comprising a thermoplastic material and the processed cross-linked polymeric foam material in the melt processor wherein the processed cross-linked foam material has a domain size, under melt mixing conditions, less than or equal to the processing spaces of the melt processor.

8. The method of claim 7, wherein the polymeric material is industrial waste, post-consumer waste, or a combination thereof.

9. The method of claim 7, wherein the melt mixing composition further comprises an additional thermoplastic, a compatibilizer or a combination thereof.

10. The method of claim 7, wherein the cross-linked polymeric foam is an open cell foam.

11. The method of claim 7, wherein the cross-linked polymeric foam is a closed cell foam.

12. The method of claim 7, wherein the melt mixing composition further comprises a rheology modifier.

13. The method of claim 7, wherein processed cross-linked polymeric foam is present in an amount of 1 to 99 weight percent, based on the total weight of the melt mixing composition.

14. The method of claim 7, wherein the melt processor comprises an extruder.

15. A melt-processable polymeric material comprising a thermoplastic matrix and dispersed cross-linked particles wherein the cross-linked particles are compressible.

* * * * *